United States Patent Office 3,084,389
Patented Apr. 9, 1963

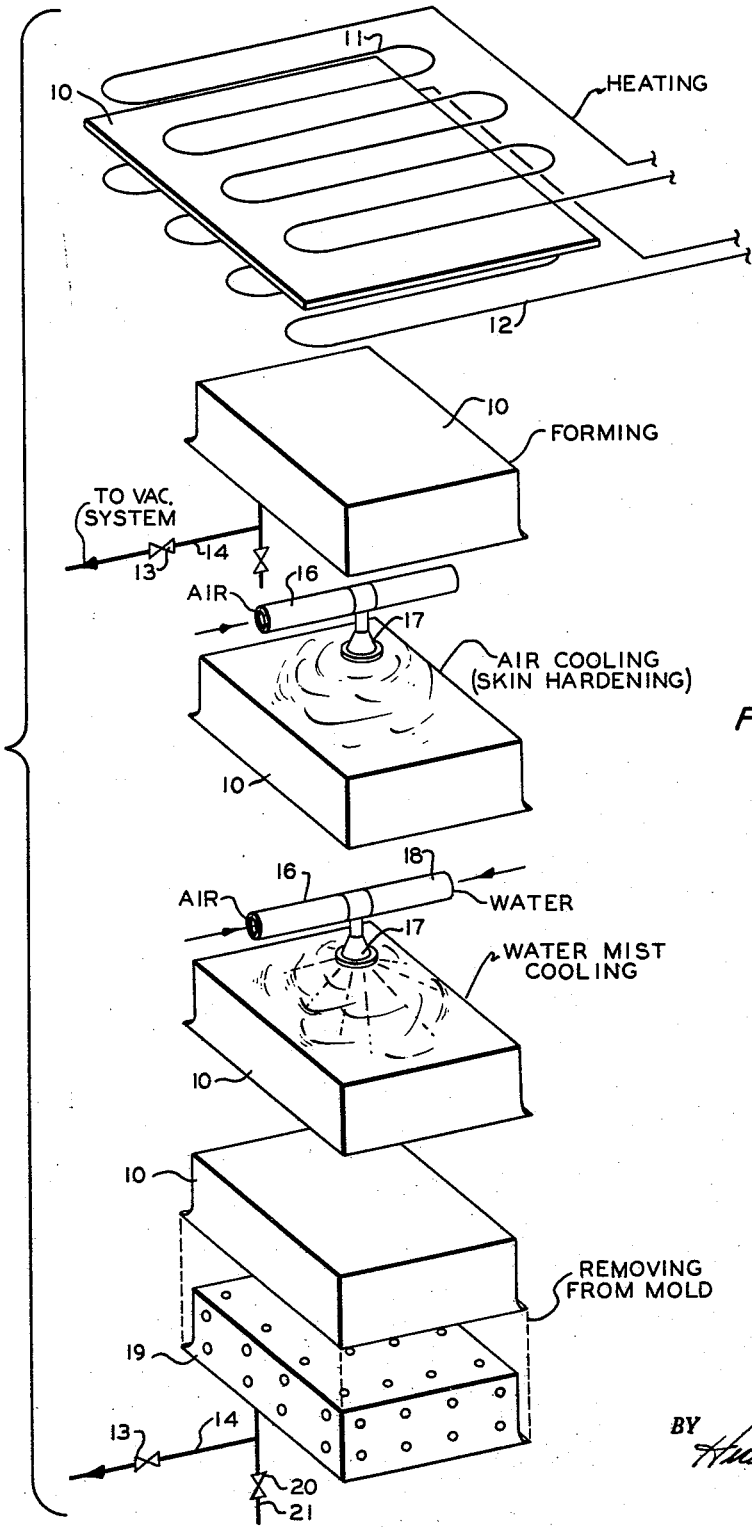

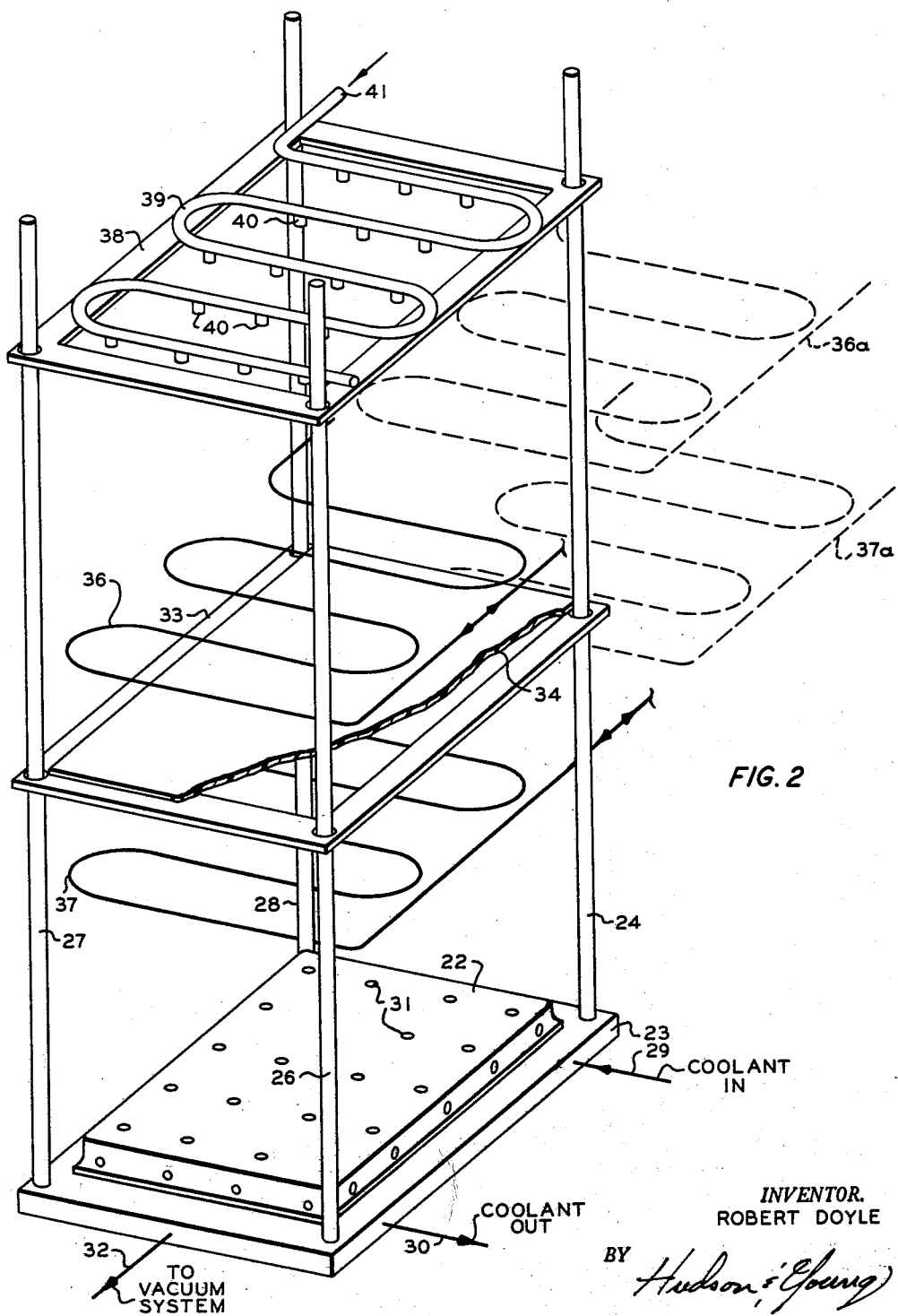

3,084,389
PLASTIC MOLDING PROCESS AND APPARATUS
Robert Doyle, Bartlesville, Okla., assignor to Phillips Petroleum Company, a corporation of Delaware
Filed July 25, 1960, Ser. No. 45,150
8 Claims. (Cl. 18—19)

This invention relates to a method and apparatus for molding thermoplastic materials. In another aspect it relates to an improved method of cooling thermoplastic materials prior to removing them from a mold. In one of its more specific aspects the invention relates to improvements in vacuum forming.

In the molding of various thermoplastic materials and especially in regard to fabrication of articles from sheet materials such as calendering or embossing and particularly in vacuum forming, the time required for cooling the molded article is a significant portion of the overall molding cycle time. It is, therefore, of considerable economic importance in plastic fabrication to use procedures which hasten the cooling of molded thermoplastics as much as possible. This problem is frequently complicated by a tendency of the molded articles to warp or become disfigured on their surface if cooled too rapidly.

In copending application of Robert Doyle et al., Serial No. 742,331, filed June 16, 1958, now Patent No. 3,019,488, the problems involved in vacuum forming high density, olefin polymers are discussed. A cooling problem, therefore, is quite significant in the fabrication of articles from solid polymers of 1-olefins having 2 to 8 carbon atoms per molecule. Since such polymers are good heat insulating materials by reason of their low thermal conductivity, they are difficult to cool rapidly from a moldable condition to a state in which it is safe to remove the articles from the mold.

I have discovered that thermoplastic materials which have been heated to a softened condition and then molded in the form of an article can be cooled more rapidly than would be expected by first passing a cooling gas over the surface of the article and thereby hardening said surface and thereafter contacting the surface of the article with a mist of vaporizable liquid. While prior methods of cooling thermoplastics have involved techniques utilizing either a cooling gas or a cooling liquid separately, to my knowledge the advantages of using a cooling gas and a mist of vaporizable liquid in sequential combination have not heretofore been recognized. I have found that the use of a cooling mist initially is to be avoided because of an embossing effect which the liquid has upon the surface of the plastic. A substantial reduction in molding cycle time can, therefore, be realized by skin hardening the plastic material first with a cooling gas, such as air, followed as soon as possible by the application of the mist of vaporizable liquid, preferably water mist. The apparatus of my invention which is useful in vacuum forming operations of thermoplastic sheet materials comprises, in combination, a mold, means for holding the thermoplastic sheet in extended position, means for heating said sheet to a moldable condition, means for evacuating the space between the sheet and the mold, means for jetting a stream of cooling gas across the exposed surface of the sheet on the mold, and means for contacting the exposed surface with a mist of vaporizable liquid.

It is an object of my invention to provide an improved method of cooling molded thermoplastic materials. Another object is to provide a method and apparatus for vacuum forming thermoplastics. Still another object is to prevent warpage of articles molded from thermoplastics with a reduced cycle time by hastening the cooling of the molded articles. Another object is to provide a cooling method in a vacuum forming operation which does not disfigure the surface of the molded article. Other objects, advantages, and features of my invention will be apparent to those skilled in the art from the following discussion and drawing in which FIGURE 1 is a diagrammatic illustration of the improved thermoforming process of my invention, and FIGURE 2 is an isometric illustration of my vacuum forming apparatus.

While the improved method of my invention can be applied advantageously in the molding of any thermoplastic material, such as polystyrene, polyvinylchloride, and the like, it is of greatest importance in regard to the solid olefin polymers, for example, polyethylene, polypropylene, polybutene, and copolymers of ethylene with other 1-olefins. In general, I prefer to practice my invention in the fabrication of solid polymers of 1-olefins having 2 to 8 carbon atoms per molecule, for example, ethylene, propylene, 1-butene, 1-pentene, 1-hexene, 1-octene, 4-methyl-1-pentene, 4-methyl-1-hexene, 4-ethyl-1-hexene, 6-methyl-1-heptene, and the like. Such monomers can be polymerized to form homopolymers or copolymerized with each other in various proportions to form copolymers. I have found that my invention is quite valuable in the fabrication of 1-olefin polymers of relatively high density. For example, the preferred ethylene polymers such as polyethylene or copolymers of ethylene with propylene or 1-butene have a density of at least 0.940 gram per cubic centimeter at 25° C., and polypropylene has a density of about 0.90 gram per cubic centimeter at 25° C.

Density determination specimens of such polymers can be made by compression molding the polymer specimens at 340° F. until completely molten, followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature. Density is determined by placing a smooth, void-free pea-sized specimen cut from a compression molded slab of the polymer in a 50-ml., glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73–78° F. the balance is adjusted until the pointer is at zero. The value shown in the scale is taken as the specific gravity. With the balance standardized to read 1.000 with a sample of distilled water at 4° C. the specific gravity will be numerically equal to density in grams per cubic centimeter.

In the molding of 1-olefin polymers it is necessary to heat the material to above the softening point of the polymer prior to fabrication. The softening point of these plastics is dependent to an extent upon the density of the polymer generally, for example, the softening temperature of the above mentioned high density ethylene polymers is above about 250° F. I prefer to use those solid 1-olefin polymers which have softening points in the range of about 250 to 330° F. The softening point as used in this specification is determined by plotting softness values vs. temperature; and the temperature at which the slope of the resulting curve equals 0.0035 softening unit per degree F. is the softening temperature. "Softness" is determined by the method of Karrer, Davis and Dieterich, Industrial and Engineering Chemistry (Analytical Edition) 2, 96 (1930).

As will be understood more fully in the description to follow, the method of my invention involves the precooling of the molded thermoplastic by contact with a cooling gas. When cooling 1-olefin polymers of the type described above, it is desirable to precool the polymer to below its crystalline freezing point. This is generally below the softening point and frequently about 10° F. below the softening temperature of the polymer. Crystalline freezing point determinations can be made by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve. Polymers which exhibit a definite crystalline freezing point are preferred for operation of my invention.

The methods of preparing polymeric materials which can be fabricated according to my invention are now well known in the art; for example, the preferred method of preparing olefin polymers is described in the patent to J. P. Hogan et al., U.S. 2,827,721, issued March 4, 1958. Other methods of preparing solid polymers of 1-olefins are likewise known such as, for example, the methods employing what are commercially referred to as "metalloorganic" catalyst systems. The plastic sheets which are used for vacuum forming in a preferred aspect of the invention can be formed by conventional methods such as by extrusion or calendering.

The method of thermoforming according to my invention is now described in more detail in connection with FIGURE 1. FIGURE 1 shows the sequential steps of a vacuum forming operation in which the molded article is cooled according to my invention. In the first step of the operation a sheet of thermoplastic 10 is softened by heating to a moldable temperature by means of heaters 11 and 12 positioned above and below the sheet of plastic material. Heaters 11 and 12 are shown as resistance coils in FIGURE 1, but various other types of heaters, such as gas jets or radiant heaters, can be used. In some cases it may be desirable to use only one heater positioned either above or below the sheet of plastic. After the plastic sheet has been heated to a partially molten state, preferably above its softening temperature (about 325 to 400° F. for ethylene polymers having a density greater than 0.940 at 25° C.), the softened sheet is placed over a mold and the space between the sheet and the mold is evacuated in order to draw the softened plastic tightly around the mold, making it conform to the configuration of the mold. The second or forming step of the operation is shown with the plastic sheet 10 in position on the mold. Air is withdrawn from between the mold and the plastic sheet by opening valve 13 in line 14 which connects to a vacuum system.

After the plastic sheet has been molded, it must then be cooled before it can be removed from the mold. In the third step of the operation the exposed surface of the plastic is skin hardened by passing air over the surface. As illustrated, air is supplied through conduit 16 and is distributed over the surface of the molded article through nozzle 17. Any cooling gas which is inert to the polymer under the conditions of molding can be used, for example, both nitrogen and carbon dioxide are suitable. Air, however, is quite satisfactory. For convenience I prefer to employ air at room temperature. The gas can be refrigerated to hasten the cooling, but very little advantage is offered thereby. The pressure of the air should be sufficient to effect good circulation across the surface of the molded article. Air pressures normally available, for example, up to 150 pounds per square inch, are quite satisfactory. The air pressure and the position of the nozzles should, of course, be regulated so as not to impinge a jet of air against the thermoplastic in such a manner as to mark the surface thereof.

Since the air cooling is relatively slow but necessary to effect skin hardening, it is desirable that this step be kept as short as possible. As soon as the plastic article is cooled sufficiently that there is no danger of embossing the surface as a result of contact with the vaporizable liquid, the mist cooling step is begun. When molding crystalline polymers of 1-olefins it is desirable to continue the air cooling until the polymer becomes opaque or until the polymer reaches its crystalline freezing point or slightly below. Air continues to be supplied to nozzle 17 through conduit 16; and, in addition, water is introduced through conduit 18. The mixture of air and water produces a mist which is distributed evenly over the surface of the molded article, quickly cooling the article to a temperature at which it can safely be removed from the mold. This final cooling temperature depends to a degree upon the desires of the fabricator. In any case the polymer should be cooled sufficiently that the article is not deformed as it is removed from the mold. Ordinarily cooling 15 or 20° F. below the crystalline freezing point is desirable, for example to below about 230° F. for high density ethylene polymers. Frequently it is desirable to cool the article sufficiently that it can be easily handled by an operator without gloves, e.g. to about 130° F. or below. The final step is removing the cooled article from the mold 19. The vacuum between the mold and the article is broken by closing valve 13 and opening valve 20 in line 21.

While water is the preferred cooling liquid for forming the mist because it is cheap and convenient to use, any vaporizable liquid which will not tend to have a solvent or other deleterious physical or chemical action upon the surface of the polymer can be used. For example, various low molecular weight alcohols such as methyl, ethyl or isopropyl alcohol or corresponding ethers could be employed. The temperature of the water can be any normal temperature of city or well water, and there is very little advantage to be gained in refrigerating the water. Since water is normally available at temperatures in the range of about 50 to 100° F., sufficient cooling of the molded article can be obtained by forming a mist of the water at this temperature and the evaporation of the water in the mist provides sufficient temperature differential between the heated plastic and the water for rapid heat transfer. The water pressure used to form the mist is not particularly significant and any water pressure normally available, for example, up to 100 p.s.i. or more, is suitable. The amount of water employed in forming the mist, of course, will vary depending upon the size of the article to be cooled. In general, the quantity of water for cooling can vary over a rather broad range, for example, from about 1 to 100 pounds of water per square foot per hour.

Referring now to FIGURE 2, apparatus is shown which is highly suitable for practicing the operation of my invention. In FIGURE 2 a vacuum forming mold 22 rests upon a platform 23. Four vertical guide rods 24, 26, 27, and 28 are attached to the platform 23 at its 4 corners. As more fully described in the copending application of Doyle et al. above mentioned, conduit means 29 and 30 are provided for circulating a heat exchange liquid to and from the mold. Mold 22 is provided with a plurality of apertures 31 which are connected through conduit 32 to a vacuum system so that the space between the mold and the plastic sheet can be evacuated thereby causing the atmospheric pressure to force the plastic sheet tightly around the mold. It should, of course, be understood that the molds of vacuum forming equipment can have a variety of shapes and can be concave as well as convex or any combination of such shapes.

Positioned on guide members 24–28 above mold 22 is a frame 33 which is used to hold plastic sheet 34 in an extended position. Frame 33 is equipped with clamps, not shown, which grip the edges of plastic sheet 34. Resistance coils 36 and 37 are positionable above and below, respectively, frame 33 in its elevated position. These resistance coils are movable laterally to the positions shown in FIGURE 2 in order to soften the plastic sheet; and after the sheet has been softened to a moldable condition, the coils are retracted laterally from between the support members to the positions as represented by the broken lines 36a and 37a.

Frame 33 is vertically movable upon guide members 24–28 so that plastic sheet 34 can be lowered in registry with mold 22. Positioned above frame 33 and vertically movable on guide members 24–28 is frame 38 which supports coils 39. Coils 39 are provided with a plurality of orifices 40 through which the cooling air and water in the form of a mist can be ejected onto the surface of the molded article. Air, and subsequently a mixture of air and water, is introduced to coil 39 through conduit 41. Frame 38 can be lowered to the proximity of the mold 22 in order to perform the cooling operation. Preferably coils 39 are shaped so as to conform generally to the configuration of the mold and the orifices in the coil are oriented toward the surface of the mold for even distribution of the cooling gas and mist.

In further illustration of my invention the following example is presented. Conditions of this example are presented as being typical and should not be construed to limit my invention unduly.

Polyethylene having a density of 0.960 gram per cubic centimeter at 25° C., and a melt index of 0.2, a softening point of about 260° F. and a crystalline freezing point of about 252° F. was thermoformed as described below. Melt index was determined according to ASTM D1238–52T using 5 samples at 2 minute intervals, averaging the 5 values (weights), discarding any values which deviate from the average by more than 5 percent (by weight), reaveraging and multiplying by 5 to obtain the amount of polymer extruded in 10 minutes.

Various thicknesses of sheet materials formed from this polyethylene were formed over a male suitcase mold. The air pressure was 100 p.s.i. and the air temperature was 70° F. Water was supplied at a pressure of 68 p.s.i. and a temperature of 59° F. at a rate of 10 pounds per square foot of surface of the mold per hour to form the mist. A single orifice having a diameter of 0.018 inch was used from 3 to 12 inches from the surface of the molded article. Polyethylene sheet was heated to about 350° F. and then vacuum formed over the mold while holding the mold temperature at 180° F. When attempts were made to cool the molded article with a water spray immediately after forming, the surface of the part was embossed or roughened in every case. An intermediate step of air cooling prevented this embossing by skin hardening the plastic article. A minimum amount of time required for air cooling under these conditions was determined for a variety of wall thicknesses of the molded article. This was the minimum amount of air cooling time required in order to cool the surface of the polymer sufficiently so that subsequent cooling with a mist had no effect on the appearance of the plastic surface. The results are shown in Table I. It was found that in every case the article had to be cooled sufficiently for the polymer to turn opaque or below its normal crystalline freezing point. It was thus established that air cooling the polymer to below its crystalline freezing point was adequate to prevent embossing by subsequent cooling with a water mist.

Table I

| Wall Thickness (mils) | Minimum air cooling time without embossing with mist (seconds) |
| --- | --- |
| 30 | 5 |
| 37 | 10 |
| 61 | 20 |
| 74 | 35 |
| 90 | 40 |
| 127 | 45 |
| 165 | 65 |

The advantage in the reduction of total cycle time in the molding operation is illustrated in the data of Table II. In these runs a sheet of polyethylene as described above having a thickness of 125 mils was vacuum formed over the suitcase mold after heating the sheet to about 350° F.

Table II

| Run No. | Mold Temp. (° F.) | Air Cooled (seconds) | Mist Cooled (seconds) | Quality of Article |
| --- | --- | --- | --- | --- |
| 1 | 180 | 50 | 40 | good. |
| 2 | 180 | 360 | 0 | warped. |
| 3 | 200 | 360 | 0 | good. |
| 4 | 200 | 240 | 0 | warped. |
| 5 | 210 | 240 | 0 | good. |
| 6 | 210 | 210 | 0 | warped. |

When the temperature of the mold was 180° F., the sheet was air cooled for 50 seconds and then cooled with a mist for 40 seconds. This sheet was removed from the mold with no warpage. Also, there was no embossing of the plastic surface. The total cooling time was thus 1½ minutes. As shown in run 2 with air cooling alone, the mold temperature had to be increased to 200° F. in order for adequate cooling in 6 minutes. Increasing the mold temperature still further to 210° F. only permitted a reduction in air cooling time to four mintues. Thus, while increasing the temperature of the mold reduced the problem of warpage, it did not permit a great reduction in cycle time. By using the sequential steps with the air and then with a water mist it was possible to reduce the mold temperature and to produce good acceptable parts, without embossing, at a much faster rate than would have been anticipated by an evaluation of each of the cooling factors alone. In a typical operation about 40 seconds are required for heating the sheet and about 25 seconds for forming it. It can be seen therefore that cooling is a substantial part of the total cycle so that greatly improved production rates are made possible by my invention.

As will be evident to those skilled in the art, various modifications of this invention can be made, or followed, in the light of the foregoing disclosure and discussion, without departing from the spirit or scope thereof.

I claim:

1. In a process in which a thermoplastic sheet is formed into a molded article by heating the sheet and thereafter forcing the sheet into the configuration of a mold by evacuating air from between said mold and the sheet, the improvement which comprises cooling the outer surface of the molded sheet by passing gas over said surface thereby hardening said surface and thereafter cooling said molded sheet by contacting said hardened surface only with a mist of vaporizable liquid.

2. A process for vacuum forming an article from a plastic sheet of 1-olefin polymer which comprises heating said sheet to above its softening point; moving said sheet into contact with a mold, evacuating air from between said sheet and said mold so as to force said sheet to assume the configuration of said mold leaving one surface of said sheet exposed, passing air over said exposed surface to cool said surface to below the crystalline freezing point of said polymer thereby hardening said surface, and thereafter contacting said hardened surface only with a water mist to further cool the molded sheet prior to removing said article from said mold.

3. The process of claim 2 wherein said polymer is an ethylene polymer having a density at 25° C. of at least 0.940 gram per cubic centimeter.

4. Apparatus for vacuum forming a thermoplastic sheet on a mold and subsequently cooling said sheet comprising, in combination, means for holding said sheet in extended position, means for heating said sheet, means for lowering said sheet to said mold, means for evacuating the space between said sheet and mold, means for jetting a stream of cooling gas across the exposed surface of said sheet to harden said sheet and means for immediately contacting said exposed hardened surface only with a mist of vaporizable liquid.

5. Apparatus for vacuum forming a thermoplastic sheet comprising, in combination a mold position on a base, a frame for holding said sheet in extended position above said mold, laterally movable heating elements positionable in heating relationship with the sheet in said frame, guide means connecting said mold base with said frame, said frame being vertically movable on said guide means to permit lowering said sheet in registry with said mold, means for evacuating the space between said mold and said sheet, a vertically movable coil member positioned above said frame, said coil member conforming generally to the configuration of said mold and containing a plurality of orifices oriented toward the mold surface, means for admitting air under pressure to said coil member, and means for admitting water to said coil with said air to form a mist at said orifices.

6. The apparatus of claim 5 wherein said mold contains means for circulation of a heat exchange medium therethrough.

7. An improved method of cooling an article of thermoplastic material which has been heated to a softened condition and molded to form said article, which comprises passing a cooling gas over a surface of said article thereby hardening said surface, and thereafter, while continuing to pass said cooling gas over said surface, further cooling said article by contacting said hardened surface only with a mist by adding a vaporizable liquid to said cooling gas.

8. Apparatus for vacuum forming a thermoplastic sheet on a mold and subsequently cooling said sheet comprising, in combination, means for holding said sheet in extended position, means for heating said sheet, means for lowering said sheet to said mold, means for evacuating the space between said sheet and said mold, means for jetting a stream of cooling gas across the exposed surface of said sheet to harden said surface, and means for adding a vaporizable liquid to said stream of cooling gas to increase the rate of cooling of said sheet.

References Cited in the file of this patent

UNITED STATES PATENTS

| | | |
|---|---|---|
| Re. 23,910 | Smith et al. | Dec. 14, 1954 |
| 2,320,115 | Young | May 25, 1943 |
| 2,349,177 | Kopitke | May 16, 1944 |
| 2,517,701 | Oettinger | Aug. 8, 1950 |
| 2,708,772 | Moncrieff | May 24, 1955 |
| 2,814,074 | Butzko | Nov. 26, 1957 |
| 2,832,094 | Groth | Apr. 29, 1958 |
| 2,836,852 | Butzko | June 3, 1958 |
| 2,955,321 | Fortner et al. | Oct. 11, 1960 |
| 2,989,780 | Zimmerman | June 27, 1961 |